US011312066B2

(12) United States Patent
Ball et al.

(10) Patent No.: US 11,312,066 B2
(45) Date of Patent: Apr. 26, 2022

(54) METHOD OF MAKING THREE-DIMENSIONAL OBJECTS BY ADDITIVE MANUFACTURING

(71) Applicants: Carbon, Inc., Redwood City, CA (US); ADIDAS AG, Herzogenaurach (DE)

(72) Inventors: Braden Reed Ball, San Carlos, CA (US); Craig B. Carlson, Los Altos, CA (US); Gregory W. Dachs, II, San Mateo, CA (US); Hardik Kabaria, San Francisco, CA (US); Sean Friedrich Walter McCluskey, Redwood City, CA (US); R. Griffin Price, Redwood City, CA (US); Hendric Vogel, Martinez, CA (US); Jacques Perrault, Portland, OR (US)

(73) Assignee: Carbon, Inc., Redwood City, CA (US)

( * ) Notice: Subject to any disclaimer, the term of this patent is extended or adjusted under 35 U.S.C. 154(b) by 301 days.

(21) Appl. No.: 16/497,119

(22) PCT Filed: Mar. 14, 2018

(86) PCT No.: PCT/US2018/022370
§ 371 (c)(1),
(2) Date: Sep. 24, 2019

(87) PCT Pub. No.: WO2018/182974
PCT Pub. Date: Oct. 4, 2018

(65) Prior Publication Data
US 2020/0376746 A1    Dec. 3, 2020

Related U.S. Application Data

(60) Provisional application No. 62/476,947, filed on Mar. 27, 2017.

(51) Int. Cl.
*B29C 33/44* (2006.01)
*B29C 41/42* (2006.01)
(Continued)

(52) U.S. Cl.
CPC ............ *B29C 64/124* (2017.08); *B29C 64/35* (2017.08); *B29C 69/02* (2013.01); *B29C 71/02* (2013.01);
(Continued)

(58) Field of Classification Search
CPC ......... B29C 33/44; B29C 41/42; B29C 43/02; B29C 43/50; B29C 51/02; B29C 51/44;
(Continued)

(56) References Cited

U.S. PATENT DOCUMENTS 5,236,637 A   8/1993  Hull
5,264,061 A   11/1993 Juskey et al.
(Continued)

FOREIGN PATENT DOCUMENTS

CN    105142450 A    12/2015
WO    2014/100462    6/2014
(Continued)

OTHER PUBLICATIONS

European Examination Report corresponding to EP 18715370.5; dated Oct. 29, 2020 (6 pages).
(Continued)

*Primary Examiner* — Leo B Tentoni
(74) *Attorney, Agent, or Firm* — Myers Bigel, P.A.

(57) ABSTRACT

Provided is a method of making a three-dimensional object, which method may include the steps of: (a) producing an intermediate object (21) from a dual cure polymerizable liquid by additive manufacturing, the intermediate object having the shape of the three-dimensional object in warped or distorted form; (b) optionally washing the intermediate
(Continued)

object; then (c) contacting the intermediate to a form (22), which form has a shape corresponding to the three-dimensional object, and with the intermediate conformed to the shape of the form; then (d) further curing the intermediate object in contact with the form to produce the three-dimensional object (24) under conditions in which the three-dimensional object retains a shape conformed to the form after separating therefrom; and then (e) separating the three-dimensional object from the form.

26 Claims, 6 Drawing Sheets

(51) Int. Cl.
| | | |
|---|---|---|
| B29C 43/02 | (2006.01) | |
| B29C 43/50 | (2006.01) | |
| B29C 51/02 | (2006.01) | |
| B29C 51/44 | (2006.01) | |
| B29C 53/04 | (2006.01) | |
| B29C 64/124 | (2017.01) | |
| B33Y 10/00 | (2015.01) | |
| B29C 64/35 | (2017.01) | |
| B33Y 40/20 | (2020.01) | |
| B29C 69/02 | (2006.01) | |
| B29C 71/02 | (2006.01) | |

(52) U.S. Cl.
CPC ............... B33Y 10/00 (2014.12); B33Y 40/20 (2020.01); *B29C 2791/001* (2013.01)

(58) Field of Classification Search
CPC . B29C 53/04; B29C 64/124; B29C 2791/001; B33Y 10/00
USPC ....... 264/233, 294, 295, 296, 320, 321, 322, 264/334, 401
See application file for complete search history.

(56) References Cited

U.S. PATENT DOCUMENTS

| | | | |
|---|---|---|---|
| 5,391,072 A | 2/1995 | Lawton et al. | |
| 5,529,473 A | 6/1996 | Lawton et al. | |
| 7,438,846 B2 | 10/2008 | John | |
| 7,892,474 B2 | 2/2011 | Shkolnik et al. | |
| 8,110,136 B2 | 2/2012 | El-Siblani | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,982,164 B2 | 5/2018 | Rolland et al. | |
| 10,155,882 B2 | 12/2018 | Rolland et al. | |
| 10,231,510 B2 | 3/2019 | Wawrousek et al. | |
| 10,240,066 B2 | 3/2019 | Rolland et al. | |
| 2013/0292862 A1 | 11/2013 | Joyce | |
| 2013/0295212 A1 | 11/2013 | Chen et al. | |
| 2014/0182170 A1* | 7/2014 | Wawrousek | A43C 13/04 36/103 |
| 2016/0016077 A1 | 1/2016 | Yokota et al. | |
| 2016/0136889 A1 | 5/2016 | Rolland et al. | |
| 2016/0137838 A1 | 5/2016 | Rolland et al. | |
| 2016/0160077 A1 | 6/2016 | Rolland et al. | |

FOREIGN PATENT DOCUMENTS

| | | |
|---|---|---|
| WO | 2015200201 A1 | 12/2015 |
| WO | 2016/145050 | 9/2016 |
| WO | 2017/001325 | 1/2017 |

OTHER PUBLICATIONS

International Search Report and Written Opinion corresponding to PCT/US2018/022370; dated Jun. 27, 2018 (11 pages).
Chinese Office Action corresponding to CN 201880021454.3; dated Aug. 4, 2021 (30 pages, including English translation).
Wei, Zhong Cheng , et al., "Optical Fiber Material Preparation Techniques", Beijing University of Posts and Telecommunications Press (English citation only), 2016, 254.
Chinese Office Action corresponding to CN 201880021454.3; dated Dec. 24, 2020 (31 pages; including English translation).
Janusziwcz et al. "Layerless fabrication with continuous liquid interface production" Proceedings of the National Academy of Sciences USA, 113(42):11703-11708 (2016).
Tumbleston et al. "Continuous liquid interface production of 3D objects" Science, 347(6228)11349-1352 (2015).
Japanese Office Action corresponding to JP 2019-552013; dated Dec. 17, 2021 (11 pages, including English translations).

* cited by examiner

METHOD OF MAKING THREE-DIMENSIONAL OBJECTS BY ADDITIVE MANUFACTURING

FIELD OF THE INVENTION

The present invention concerns additive manufacturing generally, and more specifically concerns methods in which a three-dimensional object is produced from a dual cure resin by producing an intentionally warped intermediate object by additive manufacturing, and then restoring the object to its intended finished shape in a subsequent curing step.

BACKGROUND OF THE INVENTION

In conventional additive or three-dimensional fabrication techniques, construction of a three-dimensional object is performed in a step-wise or layer-by-layer manner. Typically, layer formation is performed through solidification of photo curable resin under the action of visible or UV light irradiation. Generally referred to as "stereolithography," two particular techniques are known: one in which new layers are formed at the top surface of the growing object; the other in which new layers are formed at the bottom surface of the growing object. Examples of such methods include those given in U.S. Pat. No. 5,236,637 to Hull (see, e.g., FIGS. 3-4), U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al.

Recently, techniques referred to as "continuous liquid interface production" (or "CLIP") have been developed. These techniques enable the rapid production of three-dimensional objects in a layerless manner, by which the parts may have desirable structural and mechanical properties. See, e.g., J. DeSimone et al., PCT Application Nos. PCT/US2014/015486 (published as U.S. Pat. No. 9,211, 678); PCT/US2014/015506 (published as U.S. Pat. No. 9,205,601), PCT/US2014/015497 (published as U.S. Pat. No. 9,216,546), J. Tumbleston, et al., *Continuous liquid interface production of 3D Objects, Science* 347, 1349-1352 (published online 16 Mar. 2015), and R. Janusziewcz et al., Layerless fabrication with continuous liquid interface production, *Proc. Natl. Acad. Sci. USA* 113, 11703-11708 (Oct. 18, 2016).

More recently, dual cure stereolithography resins suitable for stereolithography techniques (particularly for CLIP) are described in J. Rolland et al., U.S. Pat. No. 9,453,142, and US Patent Application Publication Nos. US 2016/0136889, US 2016/0137838 and US 2016/016077. These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object.

A problem encountered in producing some objects from dual cure resins is the need to include supports, which wastes resin material. And, the step of removing those supports slows production, and can leave undesirable artifacts on the final object.

An additional problem can be the need to orient the object for production in a way that—while the need for supports may be minimized—the object is presented in a deep, and hence slow, orientation for additive manufacturing.

For objects that can be oriented with a flat surface contacting the carrier plate of the stereolithography apparatus, and at the same time present a shallow depth of production, the foregoing problems can be avoided. Unfortunately, not all objects have such a geometry, and a primary purpose of additive manufacturing—freedom of part design—would be defeated by re-designing the object being made to suite the apparatus on which it is made. Accordingly, there is a continued need for new techniques for additive manufacturing.

SUMMARY OF THE INVENTION

A solution to the foregoing is to make an intentionally warped or flattened version of the object for initial additive manufacturing, and also make a corresponding "negative" or reverse form having a shape that corresponds to the shape intended for the final product without the intentional warp. The warped intermediate is then placed in the template carrier for baking to impart the (typically more curved) finished shape to the product, while also making available a flattened surface (for adhesion to the carrier, elimination of supports, and/or more rapid print orientation) for the initial print. The intentional warping for the additive manufacturing step can be applied in other situations as well, and hence the warping may constitute flattening, curling, or combinations thereof. For example, where an object might otherwise be too large to fit within the operating space of a particular additive manufacturing device it may be warped to fit within that space, or where an object might otherwise be too flexible in its intended shape to be efficiently produced in an additive manufacturing device, it can be warped or curled, in any of a variety of patterns, to impart additional rigidity thereto.

Accordingly, an aspect of the invention is a method of making a three-dimensional object, which method includes the steps of: (a) producing an intermediate object from a dual cure polymerizable liquid by additive manufacturing, the intermediate object having the shape of the three-dimensional object in warped or distorted form; (b) optionally washing the intermediate object (e.g., with a wash liquid comprising an organic solvent); then (c) contacting the intermediate to a form, which form has a shape corresponding to the three-dimensional object, and with the intermediate conformed to the shape of the form; then (d) further curing the intermediate object in contact with the form to produce the three-dimensional object under conditions in which the three-dimensional object retains a shape conformed to the form after separating therefrom; and then (e) separating the three-dimensional object from the form.

In some embodiments, the configuration of the intermediate object differs from the configuration of the three-dimensional object in a manner that: (i) enhances the speed of the producing step; (ii) reduces the number of supports required for the producing step; (iii) fits within size limits of the forming step, which size limits the three-dimensional object does not fit; or (iv) a combination of the foregoing.

In some embodiments, the intermediate object is bent by the form, at least partially flattened by the form, or a combination thereof (e.g., at least one segment of the object is bent, and at least one additional segment of the object is fully or partially flattened).

In some embodiments, the form comprises: (i) a cradle, (ii) a press, (iii) a cradle and press in combination, or (iv) at least a pair of plates.

In some embodiments: (i) the three-dimensional object and the intermediate object both have a geometric boundary, which boundaries differ from one another in shape, but correspond to one another in both volume and contiguity (i.e., are a one-to-one mapping of one to the other); and (ii) the three-dimensional object and the intermediate object both have a geometric structure within the geometric boundary, which geometric structures interpolate one to the other.

In some embodiments, the three-dimensional object has predetermined mechanical properties, which mechanical properties are not met when the further curing step is carried out in the absence of the form.

In some embodiments, the intermediate object is flexible.

In some embodiments, the three-dimensional object is elastomeric.

In some embodiments, at least a portion (e.g., at least a major portion) of both the intermediate object and the three-dimensional object is in the configuration of a lattice or mesh.

In some embodiments, the producing step (a) comprises a light polymerization step, and/or the further curing step (d) is carried out by heating.

In some embodiments, the form comprises a cradle, which cradle has a shape corresponding to the three-dimensional object. In some embodiments thereof, the three-dimensional object has a length dimension, a width dimension, and a depth dimension, with the depth dimension less than either the width dimension or the length dimension, and wherein the article comprises a first non-planar surface and a second non-planar surface, with the first and second non-planar surfaces spaced apart by the depth dimension. In some embodiments thereof, the first or second non-planar surfaces of the three-dimensional object correspond to a planar surface of the intermediate object; the carrier plate comprises a planar surface; and the planar surface of the intermediate object is adhered to the planar surface of the carrier plate during the producing step (a). In some embodiments thereof, the intermediate object is bent at least in part by the form (e.g., the form includes a cradle).

In some embodiments, the form comprises a press, which press has a shape corresponding to the three-dimensional object. In some embodiments, the three-dimensional object has a length dimension, a width dimension, and a depth dimension, with the depth dimension less than either the width dimension or the length dimension, and with the width dimension less than the length dimension, the article comprising first and second opposing edge portions formed along the width dimension, the edge portions having a thickness corresponding to the depth dimension. In some embodiments thereof, the forming step is carried out along a vertical (Z) axis, the length dimension is vertically aligned with the vertical axis, the width and depth dimensions are orthogonally aligned with the vertical axis, and the article is at least partially curved around the vertical axis. In some embodiments thereof, the intermediate object is (partially or fully) flattened by the form.

In some embodiments of the foregoing, the producing step (a) is carried out by: (i) providing a carrier plate and an optically transparent member having a build surface, the carrier plate and the build surface defining a build region therebetween, with the build surface having a polymerizable liquid thereon; and (ii) producing an intermediate object on the carrier plate by irradiating the build region with light through the optically transparent member and also advancing the carrier plate and the build surface away from one another, optionally but in some embodiments preferably while maintaining a continuous liquid interface between the carrier plate and the growing intermediate object, to form from the polymerizable liquid an intermediate object, the intermediate object having the shape of the three-dimensional object in warped or distorted form. In some embodiments thereof, the optically transparent member is permeable to an inhibitor of polymerization. In some embodiments thereof, the producing step (a) is carried out by bottom-up stereolithography. In some embodiments thereof, the producing step (a) is carried out by continuous liquid interface production.

In some embodiments, the polymerizable liquid is comprised of: (a) light-polymerizable monomers and/or prepolymers that can participate in forming an intermediate object by stereolithography (preferably included in an amount of from 5, 10, or 20 percent by weight, to 50, 60, or 80 percent by weight); and (b) heat-polymerizable monomers and/or prepolymers (preferably included in an amount of from 5, 10 or 20 percent by weight, to 40, 50 or 60 percent by weight). For example, in some embodiments, the light-polymerizable monomers and/or prepolymers comprise reactive end groups selected from acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers. In some embodiments, the polymerizable liquid comprises a light-polymerizable component that degrades after light polymerization thereof in step (a) (e.g., upon heating thereof) and forms a constituent necessary for the further curing step (d).

Utility. The present invention is useful for making a variety of useful objects, including but not limited to those described in J. Rolland et al., U.S. Pat. No. 9,453,142. Specific examples of objects that can be made by the present invention include, but are not limited to, footware midsoles, large elastomeric costume body armor plates, prosthetic devices (artificial ears, etc.), decorative and functional houseware (e.g., bowls, etc.), etc.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
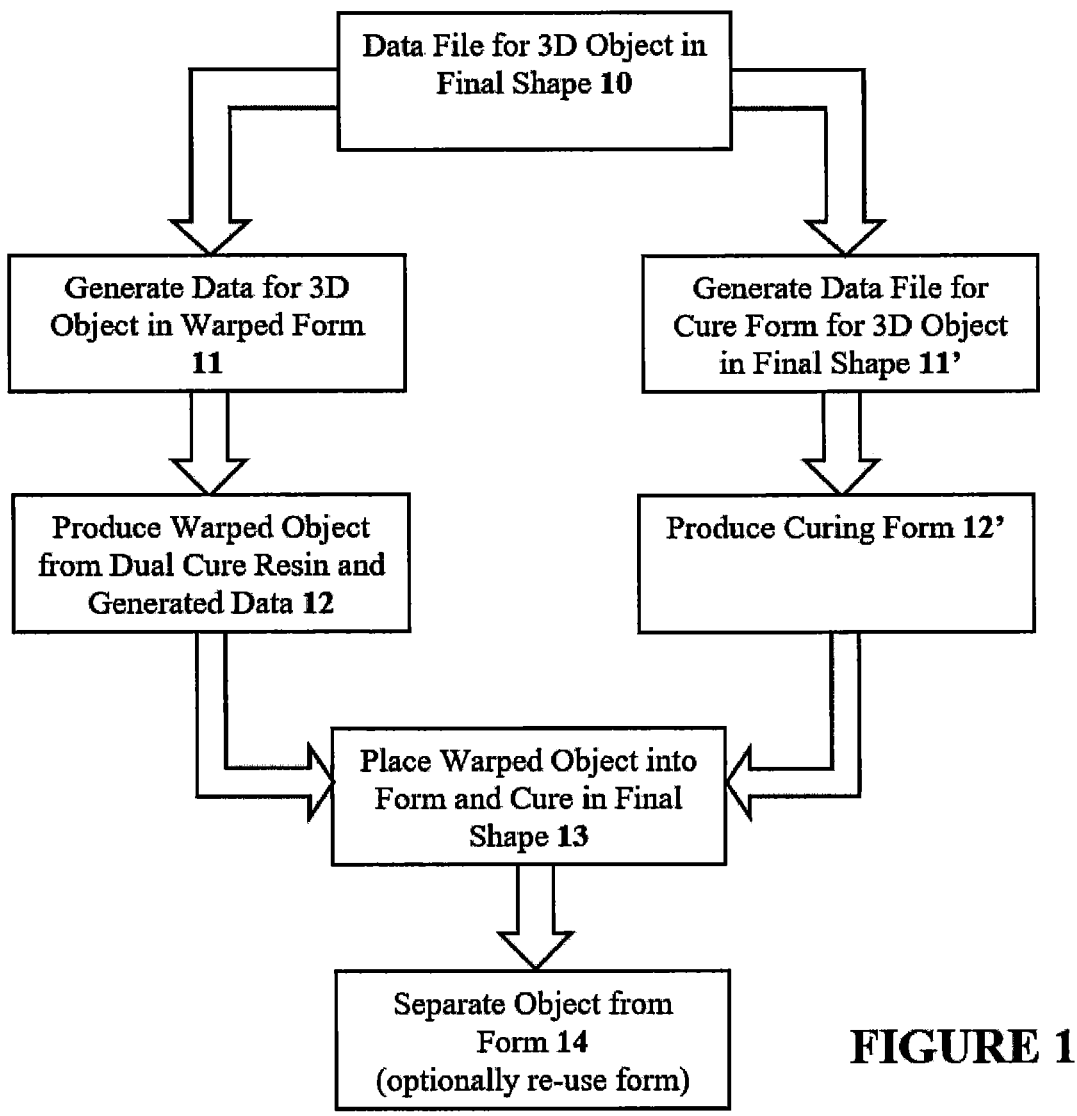
FIG. 1 schematically illustrates, as a flow diagram, one embodiment of an overall process of the present invention, in which an object is produced in a form that is warped or distorted from its original intended shape for initial additive manufacturing, contacted to a form to restore its intended finished shape, and then cured in contact with the form to produce a final object with the intended shape.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

"Shape" as used herein refers to "permanent shape." Thus, a warped intermediate object may have a permanent (warped) shape different from the permanent shape of the final object, with the change in shape between the intermediate object and the final object being caused by the further curing (and corresponding chemical and physical changes) of the material from which the object is made, during the subsequent curing of the intermediate object carried out in contact with the form.

1. Dual Cure Resins

Dual cure polymerizable liquids useful in additive manufacturing, particularly for stereolithography techniques such as continuous liquid interface production (CLIP) are known and described in, for example, J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/0160077), and PCT/US2015/036946 (see also U.S. Pat. No. 9,453,142). In general, such resins can comprise: (a) light-polymerizable monomers and/or prepolymers that can form an intermediate object (typically in the presence of a photocatalyst); and (b) heat-polymerizable monomers and/or prepolymers.

A. Light-polymerizable monomers and/or prepolymers. Sometimes also referred to as "Part A" of the resin, these are monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

B. Heat-polymerizable monomers and/or prepolymers. Sometimes also referred to as "Part B", these constituents may comprise, consist of or consist essentially of a mix of monomers and/or prepolymers that possess reactive end groups that participate in a second solidification reaction after the Part A solidification reaction. In general, for dual cure resins, examples of methods used to solidify Part B include, but are not limited to, contacting the object or scaffold to heat, water or water vapor, light at a different wavelength than that at which Part A is cured, catalysts (with or without additional heat), evaporation of a solvent from the polymerizable liquid (e.g., using heat, vacuum, or a combination thereof), microwave irradiation, etc., including combinations thereof. In this case, heat curing of the "Part B" resins is preferred.

Examples of reactive end group pairs suitable for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/azide (also known as one embodiment of "Click Chemistry," along with additional reactions including thiolene, Michael additions, Diels-Alder reactions, nucleophilic substitution reactions, etc.), alkene/Sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), perfluorovinyl (coupling to form perfluorocyclobutane), etc., where *isocyanates include protected isocyanates (e.g. oximes), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, siloxanes, epoxides, cyclic ethers, imines, cyclic acetals, etc.), etc. As will be noted from the above, the "Part B" components generally comprise at least a pair of compounds, reactive with one another (e.g., a polyisocyanate, and a polyamine).

C. Thermoplastic particles. Thermoplastic polymer particles as used herein are those that are not initially soluble in the polymerizable liquid, but can be dispersed in the liquid below the dissolution temperature thereof. "Insoluble" as used herein refers to both completely insoluble polymer particles, and poorly soluble particles which dissolve so slowly that they can be dispersed in the resin without dissolving to such an extent that they cannot be light polymerized as particles in the resin during production of a three-dimensional intermediate. Thus, the particles may be initially dispersed rather than dissolved for any reason, including but not limited to inherently immiscibility/insolubility, Upper Critical Solution Temperature (UCST), crystallization, encapsulation in a shell which melts/degrades at high temperatures (e.g., wax melt, crystal melt, hydrogen bonding, degradation at high temperature, etc.).

Optionally, but in some embodiments preferably, the thermoplastic polymer from which the particles are formed may include terminal functional or reactive groups. Suitable functional or reactive groups include, but are not limited to, amine, phenol, maleimide, and carboxyl groups. Such reactive groups may be included for any of a variety of purposes, including but not limited to promoting compatibility and adhesion between matrices, such as: the first and second curable components of the dual cure system, and the thermoplastics, may react with thermosettable component or UV curable component to form stable linkages, may react with thermosettable components or UV curable component transiently, to control domain size and morphology of phase-separated thermoplastic, may catalyze cure of thermosettable components, acting as a latent catalyst (especially amine-terminated with epoxy and cyanate ester), etc.

In general, the thermoplastic particles have an average diameter of from 0.5 to 10, 20, or 50 microns. They may be prepared from a thermoplastic polymer by any suitable technique, including but not limited to mechanical grinding, cryo milling, spray drying, coagulation, etc., along with sieving or other techniques known to those skilled in the art.

D. Additional resin ingredients. Photoinitiators included in the polymerizable liquid (resin) can be any suitable photoiniator, including type I and type II photoinitiators and including commonly used UV photoinitiators, examples of which include but are not limited to such as acetophenones (diethoxyacetophenone for example), phosphine oxides diphenyl(2,4,6-trimethylbenzoyl)phosphine oxide, phenylbis(2,4,6-trimethylbenzoyl) phosphine oxide (PPO), Irgacure 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Hardeners: Additional components (hardeners) can be used. Any suitable hardener may be used (see, e.g., U.S. Pat. Nos. 5,599,856; 6,656,979; 8,632,654; and 9,3115,698). In some embodiments, the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises a thiol or polythiol, an allyl or polyallyl (diallyls, triallyls); a maleimide; a vinyl ether, etc.

Particular examples of suitable thiol hardeners include, but are not limited to, 4,4'-dimercaptodiphenylether, 4,4'-dimercaptobiphenyl, trimethylolpropane tris(3-mercaptopropionate), pentaerythritol tetrakis(3-mercaptopropionate), 1,3,5-tris(3-mercaptopropyl)-1,3,5-triazine-2,4,6-trione, etc.

Examples of suitable allyls include, but are not limited to, allyl (meth)acrylate, 2,2'-diallylbisphenol A and triallyl-1,3, 5-triazine-2,4,6-(1H,3H,5H)-trione.

In some embodiments, the hardener comprises a latent hardener (including mixtures thereof): That is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761). Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 1,2- or 1,3- or 1,4-benzenediamines, bis(4-aminophenyl)-1, 4-diisopropylbenzene (e.g., EPON 1061 from Shell), bis(4-amino-3,5-dimethylphenyl)-1,4-diisopropylbenzene (e.g., EPON 1062 from Shell), bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis (2,6-diethylaniline) (e.g., LONZACURE® M-DEA from Lonza), methylenebis(2-isopropyl-6-methylaniline) (e.g., LONZACURE® M-MIPA from Lonza), methylenebis(2,6-diisopropylaniline) (e.g., LONZACURE® M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2', 4',6'-trimethylbenzoyl)-2-phenylimidazole or 1-benzoyl-2-isopropylimidazole (see, e.g., U.S. Pat. Nos. 4,436,892 and 4,587,311); Cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712; acylthiopropylphenols (see, e.g., U.S. Pat. No. 4,694,096) and the urea derivatives such as toluene-2,4-bis (N,N-dimethylcarbamide) (see, e.g., U.S. Pat. No. 3,386, 955); and aliphatic or cycloaliphatic diamines and polyamines if they are sufficiently unreactive. An example which may be mentioned here is polyetheramines, e.g., JEFFAMINE® 230 and 400. Aliphatic or cycloaliphatic diamines or polyamines whose reactivity has been reduced by steric and/or electronic influencing factors or/and are sparingly soluble or have a high melting point, e.g., JEFFLINK® 754 (Huntsman) or CLEARLINK® 1000 (Dorf Ketal) can also be used.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. See generally US Patent Application Publication No. 20150215430. The toughener may be uniformly distributed in the form of particles in the cured product. The particles could be less than 5 microns ($\mu m$) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

In some embodiments, the dual cure resin can be a Carbon, Inc. rigid polyurethane resin (RPU), flexible polyurethane resin (FPU), or elastomeric polyurethane resin (EPU), available from Carbon, Inc., 1089 Mills Way, Redwood City, Calif. 94063 USA.

2. Additive Manufacturing Methods and Apparatus

The intermediate object is preferably formed from polymerizable resins by additive manufacturing, typically bottom-up additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, US Patent Application Publication Nos. 2013/0292862 to Joyce, and US Patent Application Publication No. 2013/0295212 to Chen et al. Such techniques typically involve projecting light through a window above which a pool of resin (or polymerizable liquid) is carried. A general purpose carrier is typically positioned above the window and above the pool, on which the growing object is produced.

In some embodiments of the present invention, the intermediate object is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In some embodiments, the additive manufacturing apparatus can be a Carbon, Inc. M1 apparatus implementing continuous liquid interface production, available from Carbon, Inc., 1089 Mills Way, Redwood City, Calif. 94063 USA.

3. Production of Intentionally Warped or Distorted Intermediate

A. Overview. A schematic flow diagram of one embodiment of the overall process of the invention is set forth in FIG. 1. In this embodiment, an intermediate object is produced in a shape or configuration that is warped or distorted from its original, and ultimate intended, shape for initial additive manufacturing, contacted to a form to restore its intended shape, and then cured in contact with the form to produce a final object with the intended shape. In general, a data file for a three-dimensional object in its final shape is provided 10, from which data for a warped intermediate object to be produced by additive manufacturing is generated 11, which is in turn utilized to drive an additive manufacturing apparatus to produce a warped object 12. Likewise, data for a cure form, which is used to restore the warped or deformed object to its intended final shape, is generated 11' from which a curing form can be produced 12' (although the cure form can be produced by any suitable automated or manual technique, or combination thereof). The curing form may be in any suitable configuration, including cradles, presses, plates (two or more) or combinations thereof, depending on what is most suited to the shape to be imparted to the intermediate to produce the final object (e.g., substantial flattening of the intermediate to produce the final object, substantial curling of the intermediate to produce the final object, combinations thereof, etc). Next, the intermediate object is placed in contact with the form 13, cured in contact with the form (upon which curing the final shape is imparted or "locked in") and then separated from the form 14. The form can optionally be re-used for the production of additional objects.

Figure 2:
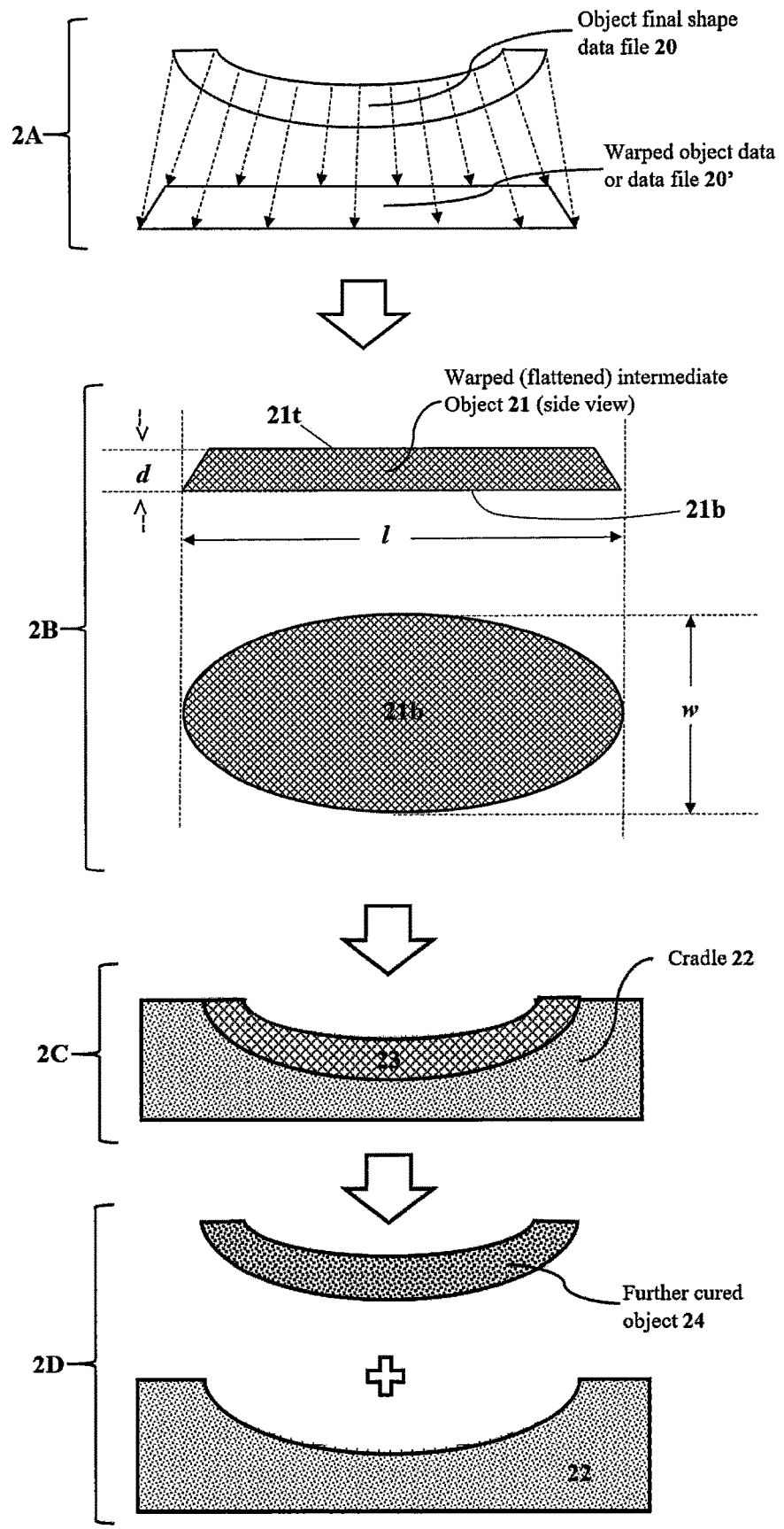
FIG. 2 schematically illustrates, for an illustrative object, the process of FIG. 1.

FIG. 2 schematically shows, for an illustrative object, the process of FIG. 1. Here, the final object is to be bowl-shaped, but it is desired to produce a flattened intermediate object. A data file for the final shape 20 is warped to produce data 20' for driving the additive device for producing the flattened object 21. The object has a length dimension l, a width dimension w, and a depth dimension d, (these representing averages), and the depth dimension is (on average) less than the length or width dimension. As illustrated, the flat bottom surface 21b contacts the flat carrier plate of the additive manufacturing apparatus, on which the object is grown—advantageously providing a flat surface for adhesion to the carrier, a shallow direction of travel for additive production (shorter manufacturing time), and a profile requiring few (if any) vertical supports. While the bottom surface 21b is in this embodiment advantageously smooth, the top surface 21t is shown flat and smooth only for schematic purposes, and can have contours and features formed thereon, including (for example) convex and concave curves, protrusions, recesses, etc., including combinations thereof. Similarly, while the objects are shown as solid for the purpose of schematic illustration, the objects may include internal spaces, passages, channels, chambers, cavities, or the like, including combinations thereof, depending on the intended purpose of the actual object.

Once the intermediate object is 21 is produced, it is separated from any carrier plate and optionally washed and rinsed (in any sequence), and placed in contact with the form—in this case a cradle 22 that imparts the original shape defined by data file 20. It is then cured in the form and separated from the form to provide a final object 24 having the original intended shape (though adjustments can be made to account for any shrinkage during the second curing, or intentional compression of the object by the form, as discussed below).

Figure 3A:
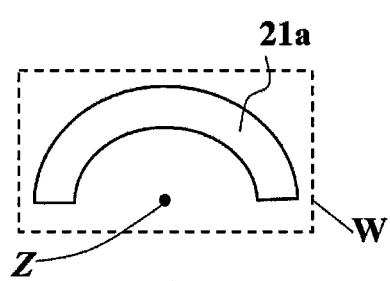
FIG. 3A schematically illustrates from a top view, an alternate embodiment of a warped or distorted intermediate of the present invention.
Figure 3B:
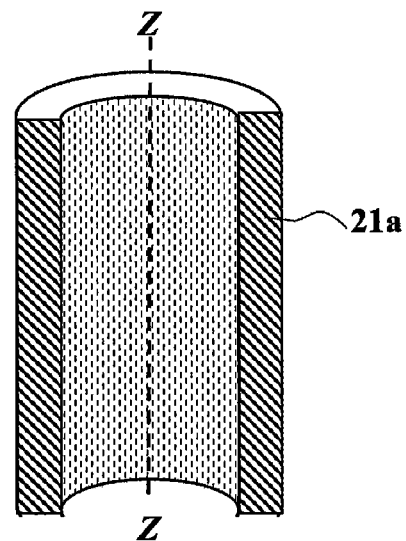
FIG. 3B schematically illustrates the embodiment of FIG. 3A, from a perspective view.
Figure 3C:
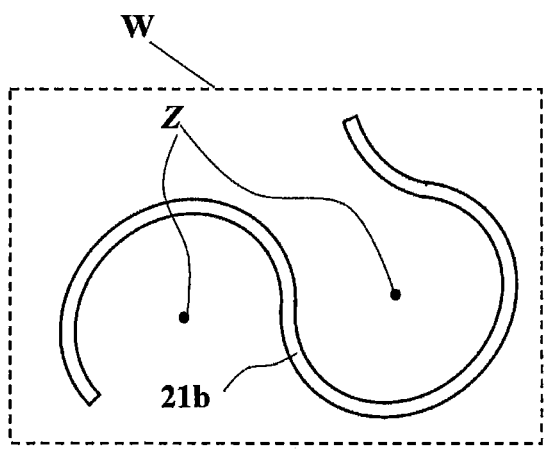
FIG. 3C schematically illustrates an additional alternate embodiment of a warped intermediate of the present invention, from a top view.
Figure 3D:
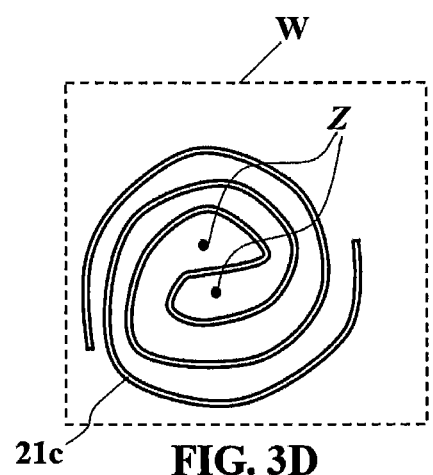
FIG. 3D schematically illustrates a still further alternate embodiment of a warped intermediate of the invention, again from a top view.

While the example of FIG. 2 suggests a process in which an intermediate is warped in a flattened manner and subsequently curled or curved in a form, the converse can also occur, and combinations of both warping and flattening can be used. For example, FIG. 3A-3B schematically illustrate an alternate embodiment of a warped or distorted intermediate of the present invention, where the intermediate object 21a is curled (FIG. 3A) when viewed from the top, to fit within the effective building window or space (shown by the dashed line of rectangle W) of the additive manufacturing device. In addition, as shown in the perspective view of FIG. 3B, since this intermediate is produced with its longest dimension aligned with the vertical axis (Z, also the direction of fabrication, or the direction in which the growing object and the build surface move away from one another), the curling of the object enhances the rigidity thereof, which may enhance the speed of fabrication during additive manufacturing (as a flexible object may be required to overcome substantial suction force before new polymerizable liquid (or "resin") can flow into the build region). FIGS. 3C-3D are similar to FIG. 3A, but show objects with a more complex, or compound, curls, about multiple vertical axes. As in the case with FIG. 2 above, while surfaces are shown as flat for the illustrative schematic, these represent average dimensions only, and may in fact have complex features formed thereon, alone or in combination with internal features such as cavities, passages and spaces within.

Figure 8:
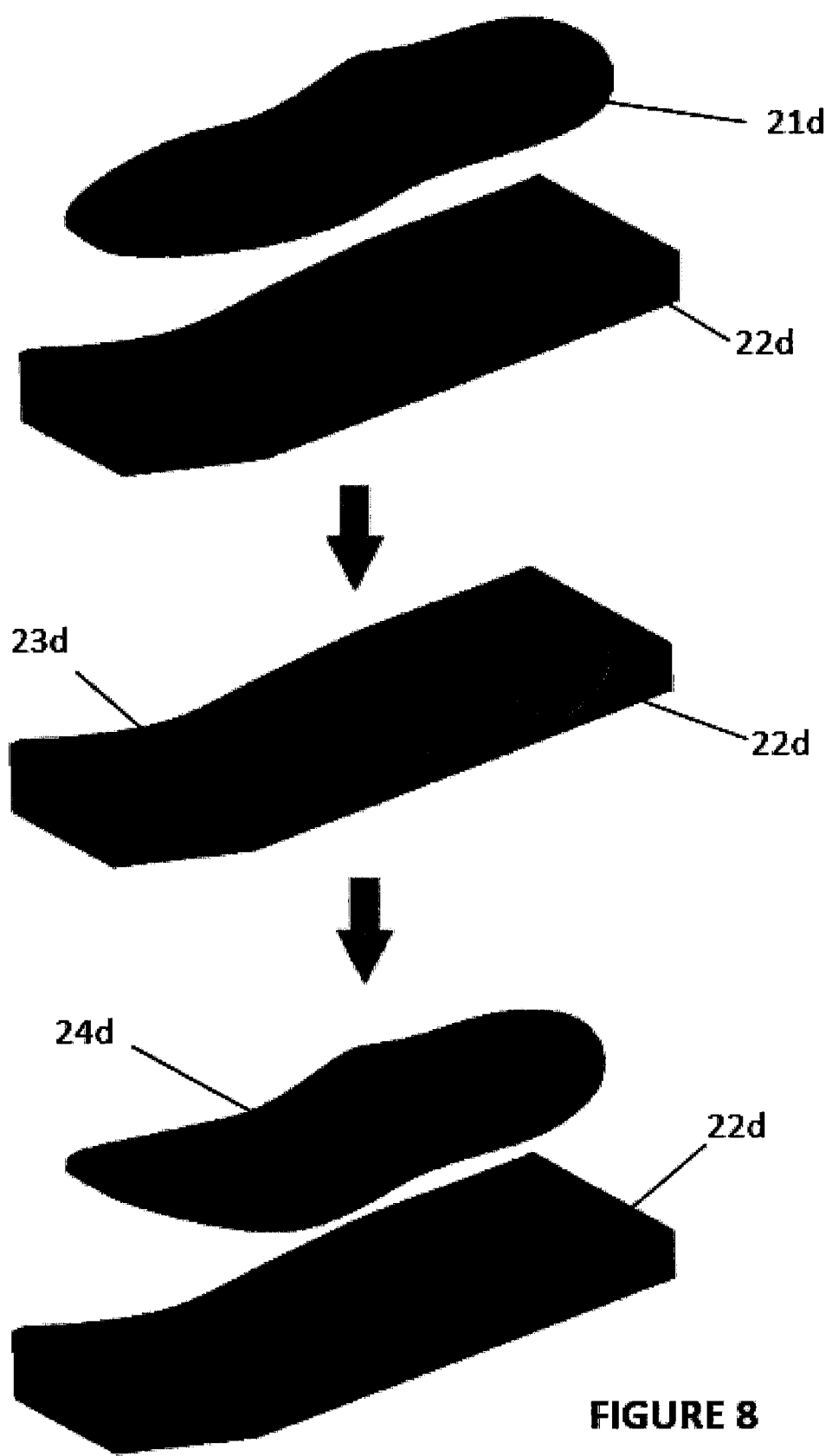
FIG. 8 schematically illustrates the process of the invention, as applied to a footware mid-sole.

FIG. 8 schematically illustrates the process of the invention, as applied to a footware mid-sole. The intermediate object 21d has a top surface (visible) and a bottom surface (not visible). The bottom surface is substantially planar and the object is warped or flattened for additive manufacturing so that the bottom surface is adhered to the carrier plate for production thereof. The top surface has additional contours and features typically associated with the top surface portion of a midsole (see, e.g., Luthi et al., U.S. Pat. No. 5,822,886 (Adidas)), and the volume of the object may have additional structural features, including voids and spaces, therein. The intermediate object 21d is placed in a cradle which serves as the form 22d, shown in a partially cut-away view, to impart its final intended shape to the intermediate object 23d, then heat cured in the cradle and separated as the final object in the final shape 24d.

Figure 4:
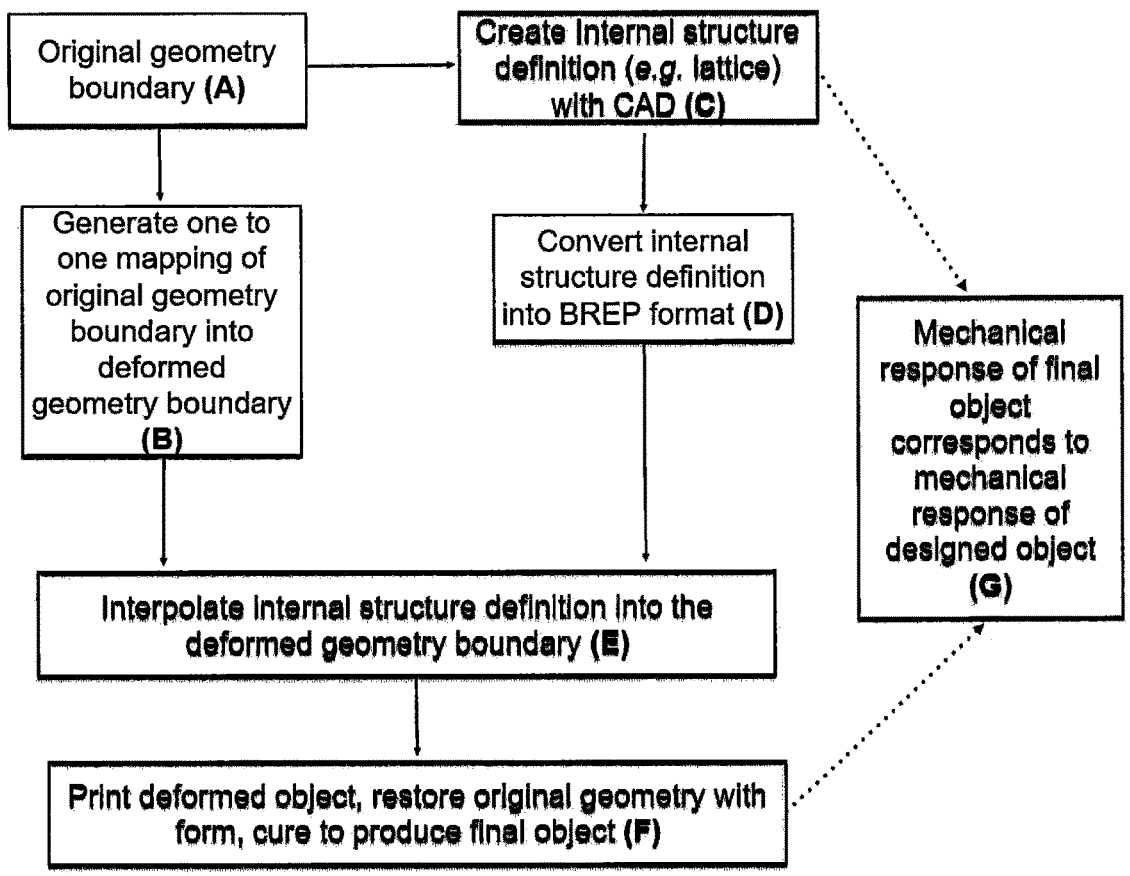
FIG. 4 schematically illustrates, as a flow diagram, one embodiment of the process of warping an original object data file for initial production of the warped intermediate object.

B. Warping procedures. A non-limiting example of generation of the warped or deformed structure input to the additive manufacturing apparatus is schematically illustrated in FIG. 4. From a file defining the object's original (or intended final) geometry (A), a deformed boundary geometry is generated (B). The deformed boundary geometry is generated as a one-to-one map of the original geometry (that is, the deformed boundary has the same volume as the original geometry, and all segments of the original object geometry remain contiguous). Deformation may be based on any suitable input, such as one surface to be deformed (e.g., deform one surface to a flat planar surface), properties of the intermediate object to be produced in deformed form (e.g., viscosity, Young's modulus, Poisson's ratio), etc., by any suitable computational technique such as finite element analysis. If appreciable shrinkage during the second curing step is contemplated, the original object can be designed with a volume that corresponds to the intermediate object, and the intermediate object when contacted to the form prior to second curing, but with the original object sized to account for shrinkage or compression.

From the boundary of the original geometry, an internal structure definition is generated (C). The internal structure definition can be produced with any suitable computer aided design (CAD) program. In some embodiments, the internal structure will include portions that are in the form of a lattice or mesh. The internal structure definition is then converted into a boundary representation (BREP) format (D), such as an .stl file format.

Figure 5:
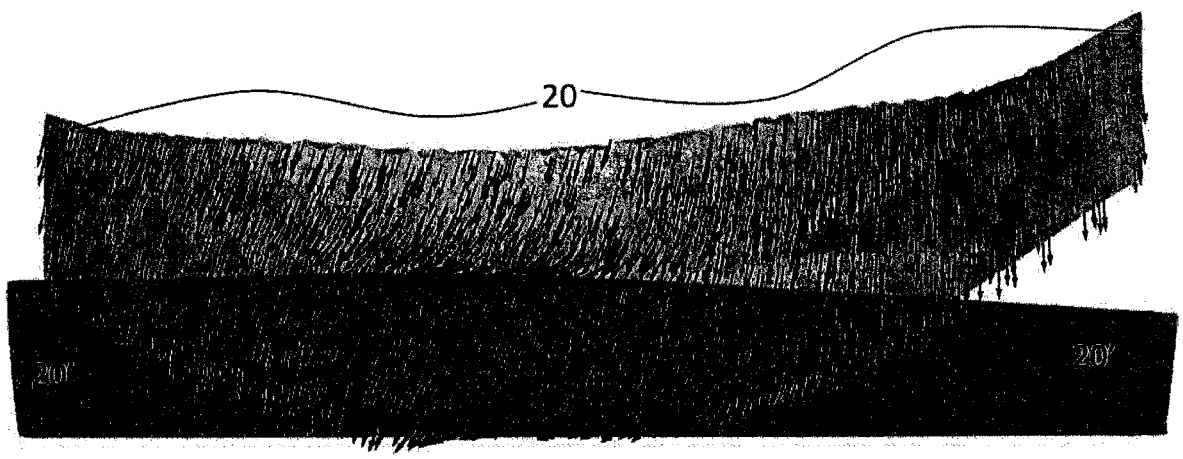
FIG. 5 schematically illustrates, as applied to an illustrative object, the warping process of FIG. 4, particularly step E therein.
Figure 6:
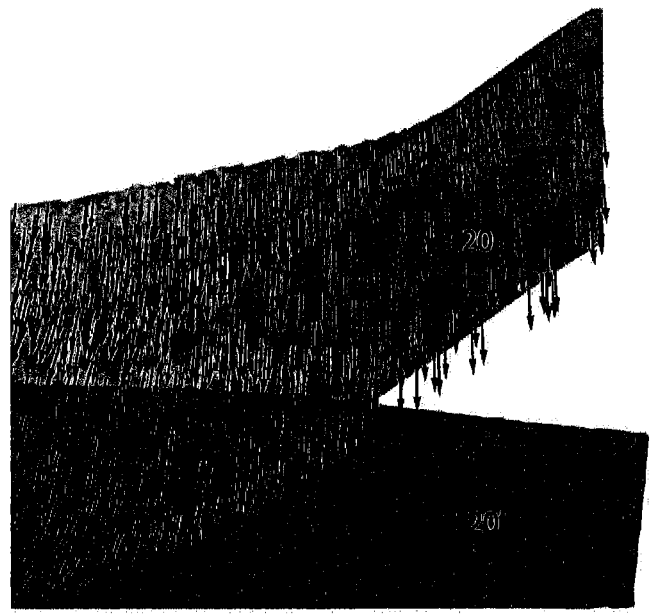
FIG. 6 is a detailed view of the right side portion of the embodiment of FIG. 5.
Figure 7:
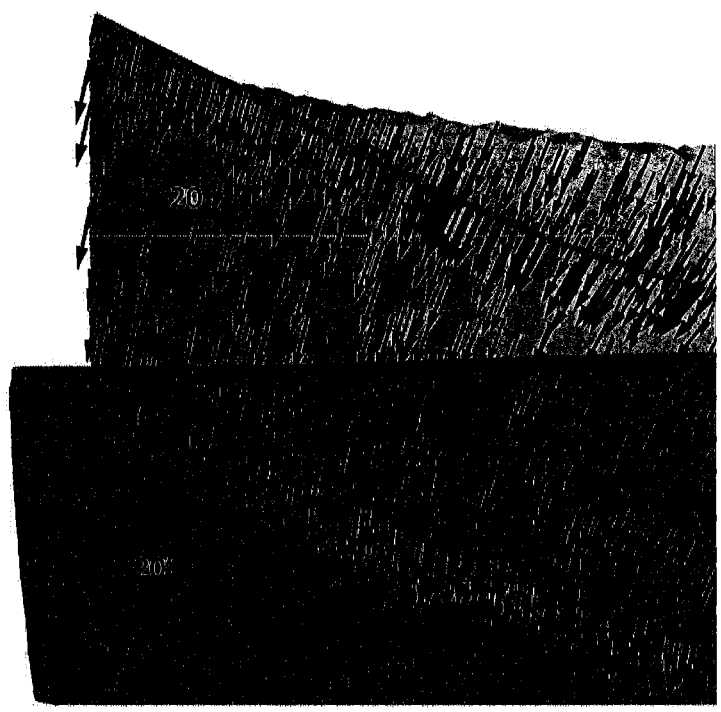
FIG. 7 is a detailed view of the left side portion of the embodiment of FIG. 5.

Next, the internal structure definition is interpolated into the deformed geometry (E). Because the deformed geometry is a one-to-one mapping of the original geometry, as noted above, interpolation can be carried out without structural features of the internal geometry inappropriately intersecting with or contacting one another. This behavior is caused by the method (e.g., finite element analysis) used for the deformation of the object from A to B, which further causes part E to be returned to its original shape F without any unduly deleterious consequences. An example of such an interpolation is schematically shown in FIG. 5, and detailed views of left and right end segments of FIG. 5 are shown in FIGS. 6-7, where the beginning of each arrow represents the location of a structural segment in the original object, and the termination (point) of each arrow represents the location of a structural segment or feature in the deformed (in this case flattened) object.

In an alternate embodiment, the steps shown in sections C, D, and E of FIG. 4 need not become physicalized in the course of the process. Instead, all three can exist in purely mathematical or point cloud space, and never become geometry. The currently preferred embodiment employs .stl files, which necessitates the approach of FIG. 4, but .stl files are not required and other options can be used. For example, files may be provided in polysurface formats exported as an .iges file, or in any suitable boundary representation (BREP) format, including mesh file formats such as .stl, .obj, .ply, .3mf, .amf, and .mesh, etc. Likewise, hardware and software choices are not critical, and programming may be done in any suitable language such as C++, Python, Fortran, etc.

C. Production of Intermediate Object by Additive Manufacturing. The data or data file for the warped intermediate can be used to drive an additive manufacturing apparatus or method (described above), to produce the intermediate object from a dual cure resin (described above), the intermediate object having a three-dimensional shape or configuration defined by the data or data file for the warped intermediate.

D. Washing. After the intermediate object is formed, it is optionally washed (e.g., with an organic solvent), optionally dried (e.g., air dried) and/or rinsed (in any sequence).

Solvents (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g, 3,3-Dichloro-1,1,1,2,2-pentafluoropropane, 1,3-Dichloro-1,1,2,2,3-pentafluoropropane, 1,1-Dichloro-1-fluoroethane, etc.); hydrofluorether solvents (e.g, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30, Dow Corning), etc.), including mixtures thereof.

Any suitable cleaning apparatus may be used, including but not limited to those described in U.S. Pat. Nos. 5,248,456; 5,482,659, 6,660,208; 6,996,245; and 8,529,703.

E. Forms. As noted above, forms for use in the present invention may be cradles, presses, plates (e.g., two or more plates), or combinations thereof, that have a shape (or more specifically, a reverse contour) corresponding to that of the final intended object. Such forms may be comprised of any suitable material, including polymers, metals (such as aluminum or aluminum alloy), inorganic materials such as ceramics, and combinations thereof. The forms can be produced by any suitable technique, including casting, machining, additive manufacturing, etc., including combinations thereof. In some embodiments, the form (or forms) may be produced by additive manufacturing on a Carbon, Inc. M1 apparatus implementing continuous liquid interface production, with a Carbon Inc. epoxy (EPX) or cyanate ester (CE) resin, all available from Carbon, Inc., 1089 Mills Way, Redwood City, Calif. 94063 USA.

Contacting of the object to the form may involve simply placing the object in a form such as a cradle, where the weight of the intermediate object is sufficient to cause the object to conform with the form, or may involve applying pressure to the intermediate object with the form to cause the object to assume its intended shape.

F. Further curing. Once contacted to the form, the object is further cured while in contact to the form to impart its final intended shape (and preferably final intended tensile properties), thereto. While further (or second) curing may be carried out by any suitable technique, including but not limited to those described in U.S. Pat. No. 9,453,142, in a preferred embodiment the further curing is carried out by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the intermediate at ambient temperature for a sufficient time to effect further cure—is in some embodiments preferred.

Ovens may be batch or continuous (conveyor) ovens, as is known in the art. Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating step is carried out at at least a first (oven) temperature and a second (oven) temperature, with the first temperature greater than ambient (room) temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

Once the further curing step is completed, the final object may be separated from the form, any routine post-processing steps (further cleaning, cutting, grinding, etc.) performed, and the object packaged or assembled with other components for delivery or for its intended use.

The foregoing is illustrative of the present invention, and is not to be construed as limiting thereof. The invention is defined by the following claims, with equivalents of the claims to be included therein.

We claim:

1. A method of making a three-dimensional object, the method comprising the steps of:
   (a) producing an intermediate object from a dual cure polymerizable liquid by additive manufacturing, the intermediate object having a shape of the three-dimensional object in warped or distorted form;
   (b) optionally washing said intermediate object; then
   (c) contacting said intermediate object to a form, which form has a shape corresponding to said three-dimensional object, and with said intermediate object conformed to the shape of said form; then
   (d) further curing said intermediate object in contact with said form to produce said three-dimensional object under conditions in which said three-dimensional object retains a shape conformed to said form after separating therefrom; and then
   (e) separating said three-dimensional object from said form,
   wherein at least a portion of both said intermediate object and said three-dimensional object is in the configuration of a lattice or mesh.

2. The method of claim 1, wherein the configuration of said intermediate object differs from the configuration of said three-dimensional object in a manner that:
   (i) enhances the speed of said producing step;
   (ii) reduces the number of supports required for said producing step;
   (iii) fits within size limits of said producing step, which size limits said three-dimensional object does not fit; or
   (iv) a combination of the foregoing.

3. The method of claim 1, wherein said intermediate object is bent by said form, at least partially flattened by said form, or a combination thereof.

4. The method of claim 1, wherein said form comprises:
   (i) a cradle,
   (ii) a press,
   (iii) a cradle and press in combination, or
   (iv) at least a pair of plates.

5. The method of claim 1, wherein:
   (i) said three-dimensional object and said intermediate object both have a geometric boundary, which boundaries differ from one another in shape, but correspond to one another in both volume and contiguity; and
   (ii) said three-dimensional object and said intermediate object both have a geometric structure within said geometric boundary, which geometric structures interpolate one to the other.

6. The method of claim 1, wherein said three-dimensional object has predetermined mechanical properties, which mechanical properties are not met when said further curing step is carried out in the absence of said form.

7. The method of claim 1, wherein said intermediate object is flexible.

8. The method of claim 1, wherein said three-dimensional object is elastomeric.

9. The method of claim 1, wherein at least a major portion of both said intermediate object and said three-dimensional object is in the configuration of a lattice or mesh.

10. The method of claim 1, wherein:
    said producing step (a) comprises a light polymerization step, and/or
    said further curing step (d) is carried out by heating.

11. The method of claim 1, wherein said form comprises a cradle, which cradle has a shape corresponding to said three-dimensional object.

12. The method of claim 11, wherein said three-dimensional object has a length dimension, a width dimension, and a depth dimension, with said depth dimension less than either said width dimension or said length dimension, and wherein said three-dimensional object comprises a first non-planar surface and a second non-planar surface, with said first and second non-planar surfaces spaced apart by said depth dimension.

13. The method of claim 12, wherein said producing step (a) is carried out by:
    (i) providing a carrier plate and an optically transparent member having a build surface, said carrier plate and said build surface defining a build region therebetween, with said build surface having the dual cure polymerizable liquid thereon; and
    (ii) producing the intermediate object on said carrier plate by irradiating said build region with light through said optically transparent member and also advancing said carrier plate and said build surface away from one another,
    wherein: said first or second non-planar surfaces of said three-dimensional object correspond to a planar surface of said intermediate object;
    said carrier plate comprises a planar surface; and
    said planar surface of said intermediate object is adhered to said planar surface of said carrier plate during said producing step (a).

14. The method of claim 11, wherein said intermediate object is bent at least in part by said form.

15. The method of claim 1, wherein said form comprises a press, which press has a shape corresponding to said three-dimensional object.

16. The method of claim 15, wherein said three-dimensional object has a length dimension, a width dimension, and a depth dimension,
   with said depth dimension less than either said width dimension or said length dimension,
   and with said width dimension less than said length dimension,
   said three-dimensional object comprising first and second opposing edge portions formed along said width dimension, said edge portions having a thickness corresponding to said depth dimension.

17. The method of claim 15, wherein:
   said producing step is carried out along a vertical (Z) axis;
   said length dimension is vertically aligned with said vertical axis;
   said width and depth dimensions are orthogonally aligned with said vertical axis; and
   said three-dimensional object is partially curved around said vertical axis.

18. The method of claim 15, wherein said intermediate object is partially or fully flattened by said form.

19. The method of claim 1, wherein said producing step (a) is carried out by:
   (i) providing a carrier plate and an optically transparent member having a build surface, said carrier plate and said build surface defining a build region therebetween, with said build surface having the dual cure polymerizable liquid thereon; and
   (ii) producing the intermediate object on said carrier plate by irradiating said build region with light through said optically transparent member and also advancing said carrier plate and said build surface away from one another,
   optionally while maintaining a continuous liquid interface between said carrier plate and the growing intermediate object,
   to form from said dual cure polymerizable liquid the intermediate object, said intermediate object having the shape of said three-dimensional object in warped or distorted form.

20. The method of claim 19, wherein said optically transparent member is permeable to an inhibitor of polymerization.

21. The method of claim 1, wherein said producing step (a) is carried out by bottom-up stereolithography.

22. The method of claim 1, wherein said producing step (a) is carried out by continuous liquid interface production.

23. The method of claim 1, wherein said dual cure polymerizable liquid is comprised of:
   (a) light-polymerizable monomers and/or prepolymers that can participate in forming an intermediate object by stereolithography; and
   (b) heat-polymerizable monomers and/or prepolymers.

24. The method of claim 23, wherein said light-polymerizable monomers and/or prepolymers comprise reactive end groups selected from acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

25. The method of claim 23, wherein said heat-polymerizable monomers and/or prepolymers comprise reactive end groups selected from: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, click chemistry reactive groups, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, ring-opening polymerization groups, and mixtures thereof.

26. The method of claim 1, wherein said dual cure polymerizable liquid comprises a light-polymerizable component that degrades after light polymerization thereof in step (a) and forms a constituent necessary for said further curing step (d).

* * * * *

UNITED STATES PATENT AND TRADEMARK OFFICE
CERTIFICATE OF CORRECTION

PATENT NO. : 11,312,066 B2
APPLICATION NO. : 16/497119
DATED : April 26, 2022
INVENTOR(S) : Ball et al.

It is certified that error appears in the above-identified patent and that said Letters Patent is hereby corrected as shown below:

On the Title Page

(56) References Cited, U.S. Patent Documents, Page 2, Column 2, Line 3: Please correct "8,110,136" to read --8,110,135--

(56) References Cited, Other Publications, Page 2, Column 2, Line 44: Please correct "(6228)11349-1352" to read --(6228):1349-1352--

Signed and Sealed this
Eleventh Day of October, 2022

Katherine Kelly Vidal
*Director of the United States Patent and Trademark Office*